US011452022B2

United States Patent
Taskin et al.

(10) Patent No.: US 11,452,022 B2
(45) Date of Patent: Sep. 20, 2022

(54) SYSTEM AND METHOD FOR CONNECTION AND HAND-OVER MANAGEMENT ACROSS NETWORKS AND SSIDS

(71) Applicant: AIRTIES KABLOSUZ ILETISIM SANAYI VE DIS TICARET A.S., Istanbul (TR)

(72) Inventors: Metin Ismail Taskin, Istanbul (TR); Muharrem Sarper Gokturk, Istanbul (TR)

(73) Assignee: AIRTIES KABLOSUZ ILETISIM SANAYI VE DIS TICARET A.S., Istanbul (TR)

( * ) Notice: Subject to any disclaimer, the term of this patent is extended or adjusted under 35 U.S.C. 154(b) by 0 days.

(21) Appl. No.: 16/681,377

(22) Filed: Nov. 12, 2019

(65) Prior Publication Data
US 2020/0084687 A1    Mar. 12, 2020

Related U.S. Application Data

(63) Continuation of application No. 15/969,474, filed on May 2, 2018, now Pat. No. 10,484,923.
(Continued)

(51) Int. Cl.
*H04W 36/38* (2009.01)
*H04W 48/20* (2009.01)
(Continued)

(52) U.S. Cl.
CPC ..... *H04W 36/385* (2013.01); *H04W 36/0083* (2013.01); *H04W 36/08* (2013.01);
(Continued)

(58) Field of Classification Search
CPC ..... H04W 36/00–385; H04W 12/1202; H04W 12/1204; H04W 48/20; H04W 84/12; H04W 88/08; H04W 88/18
See application file for complete search history.

(56) References Cited

U.S. PATENT DOCUMENTS

2011/0256870 A1 * 10/2011 Park ............ H04W 36/30
                                                         455/436
2014/0171082 A1    6/2014 Smadi et al.
(Continued)

FOREIGN PATENT DOCUMENTS

| CN | 104053199 A | 9/2014 |
|---|---|---|
| CN | 104602326 A | 5/2015 |
| WO | 2016/092121 | 6/2016 |

*Primary Examiner* — Michael Thier
*Assistant Examiner* — Prince A Mensah
(74) *Attorney, Agent, or Firm* — Volpe Koenig

(57) ABSTRACT

Systems, methods, and devices for steering an IEEE 802.11 station (STA) using a cloud server are disclosed herein. There may be a plurality of IEEE 802.11 access points (AP)s, where at least one AP of the plurality of APs operate at least a first virtual network. One or more APs of the plurality of APs may run a Client Steering Daemon (CSD) configured to perform unassociated STA monitoring that produces a log of data that may be sent to the cloud server on a regular or dynamic basis. The cloud server may receive the log data and transmit a signal to at least one of the APs of the plurality of APs to enable it to steer the STA between the first virtual network and a second virtual network.

16 Claims, 12 Drawing Sheets

Related U.S. Application Data

(60) Provisional application No. 62/500,297, filed on May 2, 2017.

(51) Int. Cl.
*H04W 36/00* (2009.01)
*H04W 36/08* (2009.01)
*H04W 36/14* (2009.01)
 H04W 84/12 (2009.01)
 H04W 88/08 (2009.01)
 H04W 88/18 (2009.01)

(52) U.S. Cl.
CPC .......... *H04W 36/14* (2013.01); *H04W 48/20* (2013.01); *H04W 84/12* (2013.01); *H04W 88/08* (2013.01); *H04W 88/18* (2013.01)

(56) References Cited

U.S. PATENT DOCUMENTS

| | | | |
|---|---|---|---|
| 2015/0139032 A1* | 5/2015 | Ko | H04W 48/16 370/254 |
| 2015/0237560 A1* | 8/2015 | Saida | H04W 48/16 370/331 |
| 2015/0373636 A1 | 12/2015 | Karaca et al. | |
| 2016/0249267 A1 | 8/2016 | Ho et al. | |
| 2017/0086121 A1 | 3/2017 | Kaushik | |
| 2017/0245190 A1* | 8/2017 | Katar | H04W 36/14 |
| 2017/0245201 A1* | 8/2017 | Ong | H04W 48/10 |
| 2017/0272317 A1* | 9/2017 | Singla | H04L 67/02 |
| 2018/0241450 A1* | 8/2018 | Shukla | H04B 7/0617 |

* cited by examiner

301 — 334 STA-Y1 moves to a location that is covered by both 310 Premise-X and 330 Premise-Y 302 — 334 STA-Y1 remains connected to 313 SSID_Public of 311 AP-X after the move 303 — The 331 AP-Y performs unassociated-client-monitoring to assist the CSD; if there are client's within range of 331 AP-Y that are unassociated, this information will be logged and sent to the 350 Cloud Server 304 — The 350 Cloud Server shares the logged information with the 311 AP-X 305 — Once the 311 AP-X is aware of the fact that 334 STA-Y1 (which is associated with 311 AP-X) is in the vicinity, it steers it to 332 SSID_Private_Y

FIG. 3B 401
434 STA-Y1 moves to a location that is covered by both 410 Premise-X and 330 Premise-Y 402
434 STA-Y1 remains connected to 413 SSID_Public of 411 AP-X after the move 403
The 431 AP-Y performs unassociated-client-monitoring to assist the CSD; if there are client's within range of 431 AP-Y that are unassociated, this information will be logged and sent to the 450 Cloud Server 404
The 450 Cloud Server sends a deauthenticate command to 411 AP-X to release 434 STA Y1, and 434 STA-Y1 is blacklisted on all interfaces/networks except a preferred interface/network 405
Once the 434 STA-Y1 has been disassociated, it may then connect to an available interface in the vicinity (i.e., 432 SSID_Private_Y)

FIG. 4B 501
534 STA-Y1 moves to a location that is covered by both 510 Premise-X and 530 Premise-Y 502
534 STA-Y1 remains connected to 513 SSID_Public of 511 AP-X after the move 503
The 531 AP-Y performs unassociated-client-monitoring to assist the CSD; if there are client's within range of 531 AP-Y that are unassociated, this information will be logged and sent to the 550 Cloud System.

504
The 550 Cloud System shares the logged information with all of the mesh APs of 510 Premise. Thereafter, 511 AP-X1 and 516 AP-X2 become aware of the fact that 534 STA-Y1 (which is associated with 511 AP-X1) is in the vicinity.

505
534 STA-Y1 is steered to 531 AP-Y

FIG. 5B 601
634 STA-Y1 moves to a location that is covered by both 610 Premise-X and 630 Premise-Y 602
634 STA-Y1 remains connected to 613 SSID_Public of 611 AP-X after the move 603
The 631 AP-Y performs unassociated-client-monitoring to assist the CSD; if there are client's within range of 631 AP-Y that are unassociated, this information will be logged and sent to the 650 Cloud Server 604
The 650 Cloud Server shares the logged information with only the central controller 611 AP-X1 of 610 Premise-X 605
The central controller 611 AP-X1 may share the information the logged information about 634 STA-Y1 with 616 AP-X2

606
634 STA-Y1 is steered to 631 AP-Y by 611 AP-X1 which includes deauthenticating and blacklisting 634 STA-Y1 as well as sending a command to 615 AP-X2 to blacklist 634 STA-Y1 as well

FIG. 6B

SYSTEM AND METHOD FOR CONNECTION AND HAND-OVER MANAGEMENT ACROSS NETWORKS AND SSIDS

CROSS-REFERENCE TO RELATED APPLICATIONS

This application is a continuation of U.S. Non-Provisional patent application Ser. No. 15/969,474, filed on May 2, 2018 which claims the benefit of U.S. Provisional Application No. 62/500,297 filed on May 2, 2017, the contents of which is hereby incorporated by reference herein.

FIELD OF ART

This disclosure is related to wireless communication networks.

BACKGROUND

In the area of wireless communication networks, there may be a wireless device that connects to a first access point when the wireless device is within range of the first access point. The first access point may provide two logical interfaces associated with two virtual networks, such as a public and private network. The wireless device may move and it may be appropriate to connect to a different access point and/or logical interface depending on a variety of factors. In some cases, there may be issues relating to facilitating and determining which access point and/or logical interface to connect to when there is more than one option. Solutions for this, and other wireless communication problems, are addressed herein.

SUMMARY

Systems, methods, and devices for steering an IEEE 802.11 station (STA) using a cloud server are disclosed herein. There may be a plurality of IEEE 802.11 access points (AP)s, where at least one AP of the plurality of APs operate at least a first virtual network. One or more APs of the plurality of APs may run a Client Steering Daemon (CSD) configured to perform unassociated STA monitoring that produces a log of data that may be sent to the cloud server on a regular or dynamic basis. The cloud server may receive the log data and transmit a signal to at least one of the APs of the plurality of APs to enable it to steer the STA between the first virtual network and a second virtual network.

BRIEF DESCRIPTION OF THE DRAWINGS

A more detailed understanding of the drawings may be had from the following description but is not intended to limit the scope of the embodiments but to merely serve as examples in conjunction with the accompanying drawings, wherein like reference numerals in the figures indicate like elements, and wherein:

FIG. 3B illustrates an example process of the scenario shown in FIG. 3A;

FIG. 4B illustrates an example process of the scenario shown in FIG. 4A;

FIG. 5B illustrates an example process of the scenario shown in FIG. 5A; and

FIG. 6B illustrates an example process of the scenario shown in FIG. 6A; and

DETAILED DESCRIPTION

Internet Service Providers (ISPs) try to provide ubiquitous Wi-Fi Internet access to their customers through a number of approaches. For example, ISPs may utilize customer deployed Wi-Fi equipment, such as Gateways (GWs), routers, Access Points (APs), and the like that operate on customer premises. A customer that subscribes to ubiquitous Wi-Fi Internet service provided by an ISP may get access rights to the Internet through ISP deployed Wi-Fi networks, and/or other customer deployed Wi-Fi networks that operate within other customers' premises. This enables ISPs to provide Wi-Fi Internet access to their customers not only at their customers premise through the customers own Wi-Fi network but also at other locations through the Wi-Fi networks of other customers. ISPs may implement this by using two separate virtual networks in a physical Wi-Fi network. One of the virtual Wi-Fi networks is open to public access, whereas the other virtual Wi-Fi network is specific to private access.

A virtual public Wi-Fi network that offers Internet access to any customer may be identified by one SSID (e.g., "SSID_public") and a virtual private Wi-Fi network that offers Internet access to one specific customer may use a different SSID (i.e., "SSID_private"). This way, customers that have the credentials, namely the network password (i.e., key) that utilizes a security standard (e.g., 802.1x, WPA, WPA2, etc.), for the specific network SSID may gain access to the Internet when they are in the vicinity of a Wi-Fi network that has the appropriate service. As discussed herein, the vicinity or coverage of a Wi-Fi network may be an area around a broadcasting point, such as an AP, where a client or a station (STA), can connect to the AP.

Figure 1:
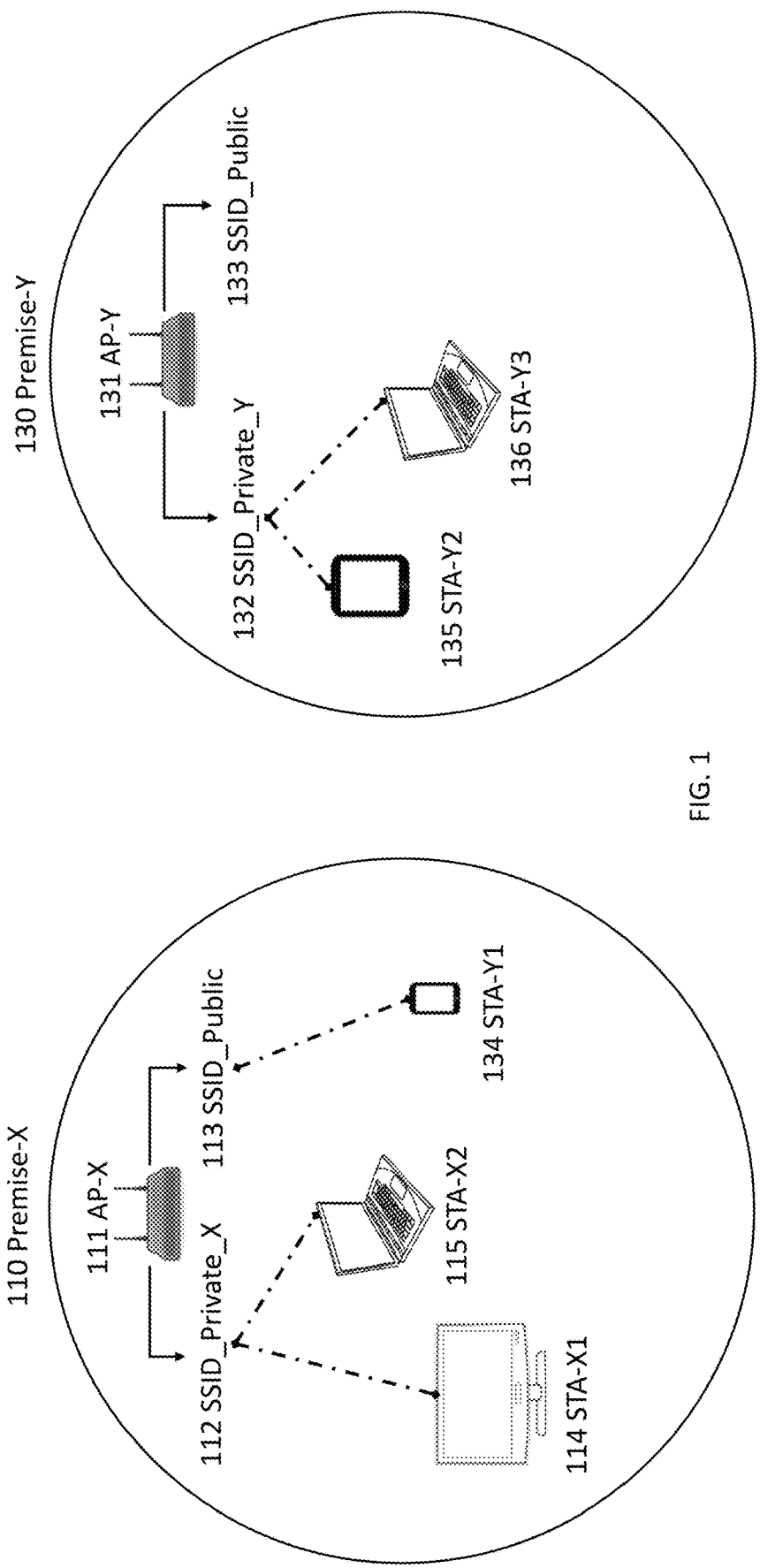
FIG. 1 illustrates an example scenario of multiple wireless networks.

FIG. 1 illustrates an example scenario of multiple wireless networks. Specifically, in the example there are two physically separate networks provided by 111 AP-X and 131 AP-Y at 110 Premise-X and 131 Premise-Y, respectively. Each AP provides both public and private Internet service. The public service 113 SSID_Public and 133 SSID_Public may be the same virtual networks among all networks, whereas the private SSID may be different for each physical network. For example, in FIG. 1, 110 Premise-X's private network's SSID is 112 "SSID_Private_X," whereas 130 Premise-Y's private network's SSID is 132 "SSID_Private_Y." For a given premise, various devices may belong to a network provided by an AP. For example, 111 AP-X may "own" a TV 114 STA-X1 and/or a laptop 115 STA-X2 and be connected to the 112 SSID_Private_X, where 131 AP-Y may "own" a tablet 135 STA-Y2 and a laptop 136 STA-Y3 connected to 132 SSID_Private_Y, and also "own" 134 smart phone STA-Y1 even though it is currently connected to 113 SSID_Public of 111 AP-X.

In the example shown in FIG. 1 the customers of each premise may have subscribed for public and private Internet service from the ISP. This way, a client device of one of the customers that is located outside the coverage of its own private network but within the coverage of another network that offers public Internet service, can gain access to the Internet through the SSID_Public virtual network. As illustrated in FIG. 1, 134 STA-Y1 accesses the Internet through 113 SSID_Public when it is located within the coverage of 110 Premise-X. A virtual public network, such as 113 SSID_Public or 133 SSID_Public, may limit Internet usage per client device, or it may share a small fraction of the total bandwidth, whereas a virtual private network, such as 112 SSID_Private_X and 132 SSID_Private_Y, may provide higher bandwidth and unlimited Internet access for each client device.

One issue that may arise in the example associated with FIG. 1 is when a client, such as smart phone 134 STA-Y1, that has connected to 113 SSID_Public while outside of its private network 132 SSID_Private_Y may stay at a public SSID (i.e., 133 SSID_Public) even when it returns to the vicinity of its own private network 132 SSID_Private_Y. Also, if the client has credentials of multiple SSIDs, such as both "SSID_Public" and "SSID_Private" the decision as to which SSID to associate with may be controlled solely by the client, and the client may not employ reliable logic that can differentiate the QoS offered by different SSIDs, before establishing Link Layer connectivity (i.e., before association). Clients may employ SSID preference lists and initiate association to the first SSID in the list then if they cannot establish connection with the first SSID in the list, they try to associate with the second SSID in the list, and so on. A client may keep the last associated SSID on the top of the list.

In one example, clients may favor SSIDs with the higher RSSI among the SSIDs they have the credentials for; however, if an SSID_Public and SSID_Private are on the same physical band, such as the 5 GHz band, then the AP's RSSI observed by the client may be the same for both SSIDs and the client may not favor one of the SSIDs based on its RSSI. In this example, a client may choose to connect with the last SSID it has associated with, choose to connect with the SSID it identifies first, or choose the SSID to connect to in a random fashion. In this example, the issue that a STA may not be connected to the preferred network/AP still needs to be addressed.

As discussed herein, there may be systems, methods, and devices that manage client connections when clients can roam between physically different and spatially distributed networks, and where these networks employ both a common virtual Wi-Fi network identified by a common SSID (e.g. SSID_Public) network-password pair, and separate private virtual Wi-Fi networks identified by unique SSID network-password pairs. Also, there may be systems, method, and devices for managing client hand-over across-networks, across-SSIDs, across-APs, and across-bands. For example, there may be a process addressing how to hand-over a client connected to SSID_X on 2.4 GHz Wi-Fi band of AP-X to SSID_Y on 5 GHz band of AP-Y, where AP-X and AP-Y are different access points that are spatially separated, possibly located in different customer premises.

As discussed herein, systems, methods, and devices may be described from the point of view of a Wi-Fi network, however, a person skilled in the art will find it straightforward to apply the explained techniques to any wireless communication network. Specific embodiments described herein are not intended to be limiting but rather examples of implementations in line with the principles disclosed.

Figure 2A:
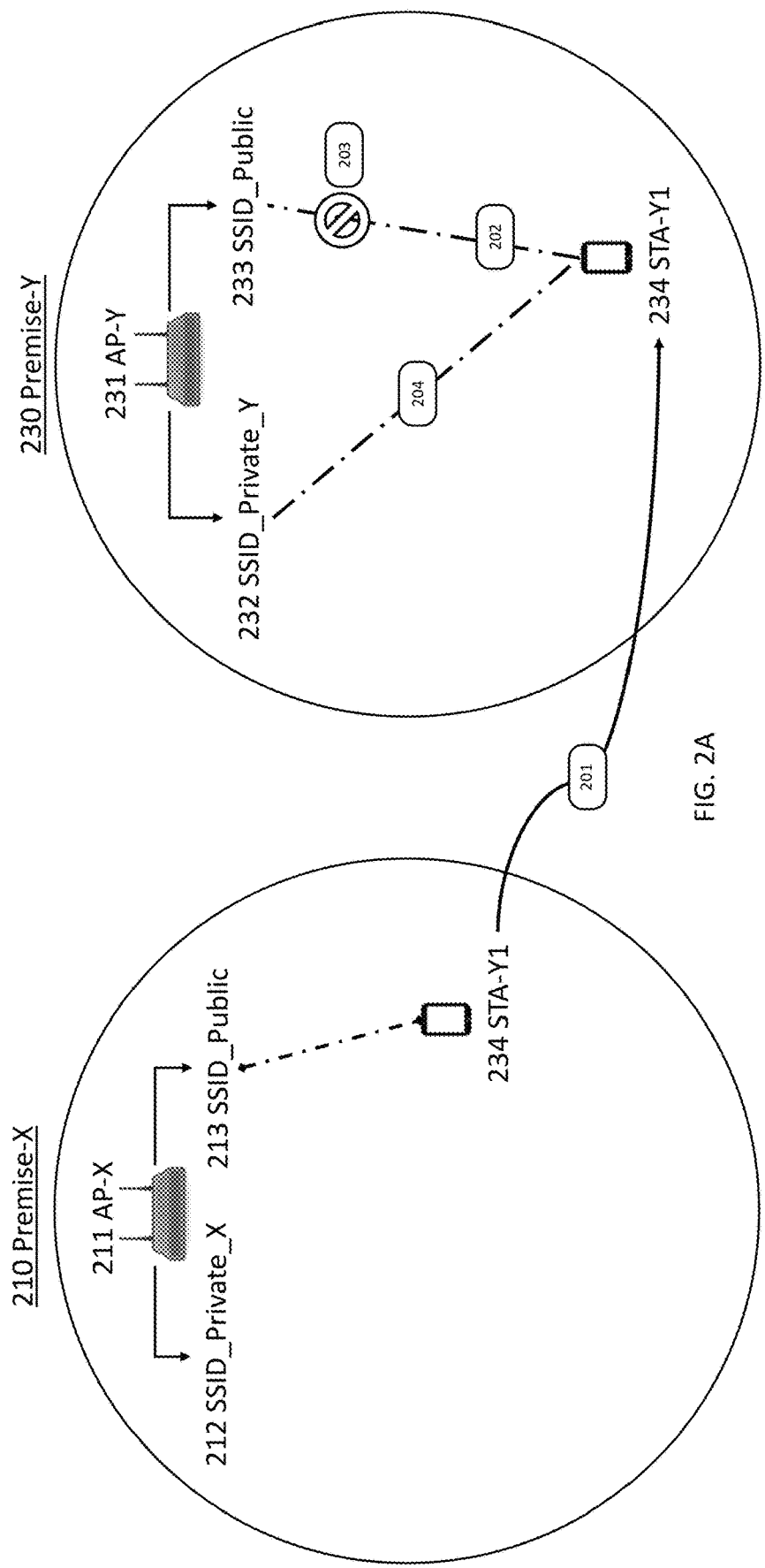
FIG. 2A illustrates an example scenario of multiple wireless networks where a client moves from one network to another.
Figure 2B:
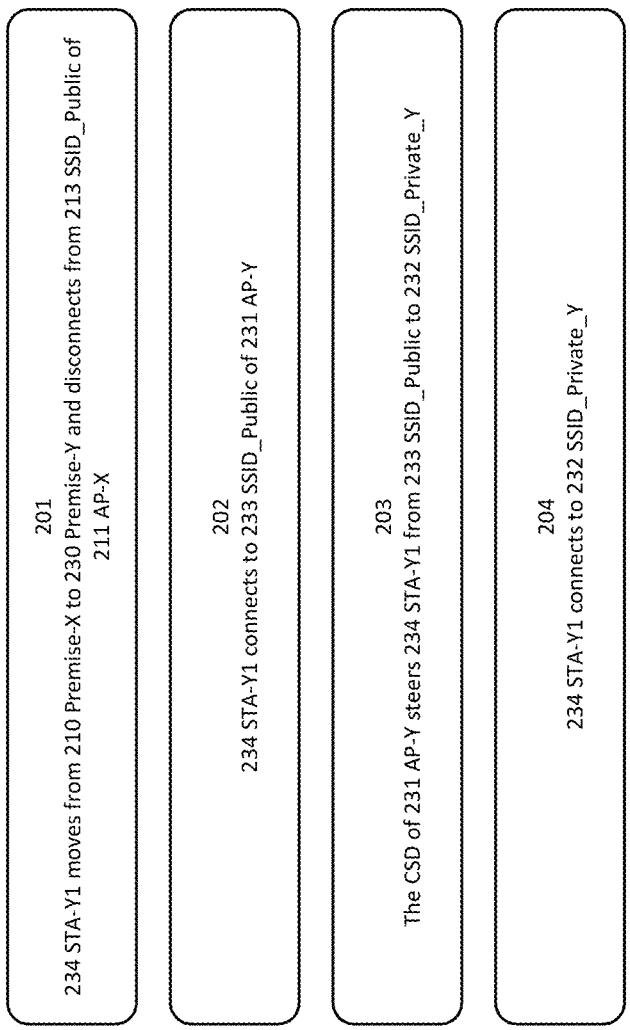
FIG. 2B illustrates an example process of the scenario shown in FIG. 2A.

FIG. 2A illustrates an example scenario similar to FIG. 1 with two different and spatially distributed Wi-Fi networks of 210 Premise-X and 230 Premise-Y. FIG. 2B illustrates a flow chart of an example process to be carried out in the scenario of FIG. 2A. Each Wi-Fi network of 211 AP-X and 231 AP-Y provides a public virtual Wi-Fi network named 213 SSID_Public and 233 SSID_Public, respectively, as well as a separate private virtual Wi-Fi network named 212 SSID_Private_X and 232 SSID_Private_Y.

In the example shown, 234 STA-Y1 belongs to 230 Premise-Y in that 234 STA-Y1 possesses the security credentials to access 232 SSID_Private_Y. Also, 234 STA-Y1 possesses the security credentials to access any "SSID_Public" of any network. Once 234 STA-Y1 goes out of the coverage of its own Wi-Fi network of 230 Premise-Y, it connects to the closest Wi-Fi network that provides public access Internet through "SSID_Public." Specifically, 234 STA-Y1 may begin at 201 where it is located at 210 Premise-X and has a connection with 213 SSID_Public of 211 AP-X, and in doing so it gains access to the Internet while being located away from 230 Premise-Y where it belongs.

The 234 STA-Y1 may travel at 202 back to 230 Premise-Y, where it may connect with 233 SSID_Public of 231 AP-Y since the public SSID was the name of the last successful connection at 211 AP-X. If 234 STA-Y1 establishes a connection with 233 SSID_Public in a situation where the public virtual network has service limitations, it would not be able to utilize the full extent of its own network's resources as would be provided if it connected to 232 SSID_Private_Y. In a situation where 233 SSID_Public and 232 SSID_Private_Y reside on the same physical interface (i.e., band) (e.g., 5 GHz band) the observed RSSI by 234 STA-Y1 of both SSIDs would be the same. Thus, 234 STA-Y1 would have no reason to roam from 233 SSID_Public to 232 SSID_Private_Y based on any network selection priority/parameters.

In one embodiment, 231 AP-Y may have a Client Steering Daemon (CSD) that manages client connections and roaming of various stations/client devices. CSDs running on different APs that reside in the same network may communicate with each other using the network communication infrastructure. As discussed herein, an AP that does not employ a CSD may be considered a Legacy-AP. For example, 111 AP-X and 131 AP-Y of FIG. 1 may be Legacy-APs. Further, 231 AP-Y and 211 AP-X may employ a CSD.

The 234 STA-Y1 may have secure credentials for a private network, such as 232 SSID_Private_Y, and my designate this network as the STA_Owner. In order for a CSD to identify a STA as belonging to a private network, the STA shall have established a connection with the private network at least once within a predetermined but configurable period of time. For example, 231 AP-Y is designated as the STA_Owner of 234 STA_Y1, if 234 STA_Y1 has established connection with 232 SSID_Private_Y of 231 AP-Y at least once during the last 7 days.

A CSD running on an AP may periodically check its interfaces if a client, which it is the STA_Owner of, is associated with its own public SSID. If the CSD detects a STA that satisfies this condition, it may steer the STA to the private network so that the STA can make use of the resources dedicated to the private network. For example, at 203 when it is detected that 234 STA-Y1 is on 233 SSID_Public, then the CSD of 231 AP-Y may steer 234 STA-Y1 to a different logical interface (i.e., preferred SSID 232 SSID_Private_Y). Steering at 204 may require that 234 STA-Y1 is first deauthenticated and blacklisted on every interface where SSID_Public is broadcasted on 230 Premise-Y so that 234 STA-Y1 disconnects and cannot reconnect to the public SSIDs (e.g., SSID_Public interfaces such as 213 SSID_Public and 233 SSID_Public), and then the 234 STA-Y1 may connect to 232 SSID_Private_Y. Steering as discussed herein may mean that the client in question is deauthenticated from a particular interface of an AP it is currently connected to and at the same time blacklisted on all interfaces of the AP(s) that are not preferred, at which point the client may have no other option but to associate with the preferred network to which it belongs.

If 232 SSID_Private_Y is enabled on more than one interface (e.g., on an interface that runs in the 2.4 GHz band, and on an interface that runs in the 5 GHz band) the CSD may carry out cost evaluation in order to select the interface that provides the least end-to-end cost for a given STA. A STA may be steered to the interface that provides the minimum cost.

In some situations, a CSD may make use of further metrics for deciding whether to steer a client from a public SSID to a private SSID. For example, a CSD may choose to keep a client/STA in a public network based on one or more conditions, such as if the CSD concludes that the STA is so far away from an AP that steering it to a private network may reduce the private network's own capacity, and/or the public network is underutilized where as a private network is over utilized so the STA would be better off with the public network. For the condition where the STA is far away, the CSD may make use of RSSI, physical rate, and packet error rate (PER) information, whereas for the condition where the public network is underutilized the CSD may take into account of traffic (load) information on the Wi-Fi interfaces of the public and private networks. Note that all decision metrics listed herein may be used in combination or selectively in order to come to a determination.

queries of CSDs. In further embodiments, the Cloud Server may direct an AP to carry out specific actions, such as deauthenticating a client, by using standard protocols such as TR-69, for example.

An AP may not need to employ a CSD to communicate with a Cloud Server. Legacy-APs may communicate with a Cloud Server through any supported protocol, such as TR-69. Legacy-APs, since they do not employ a CSD, may not push client information specifically gathered by the CSD to a Cloud Server, but a Cloud Server may make use of protocols such as TR-69 to manage Legacy-APs to run supported commands.

STA_Owner information may be kept track of at a Cloud Server, and this information may be used by a CSD in client steering decisions. As discussed herein, a Cloud Server may be used in any scenario or embodiment even though it may not be explicitly shown or referenced in all cases. Moreover, in certain embodiments, a Cloud Server can request Legacy-APs to carry out certain actions, such as deauthenticating a STA, when it recognizes that a STA connected to the Legacy-AP through the public SSID is in fact in the vicinity of its STA_Owner. In this specific case, the STA_Owner may need to employ the CSD in order to detect the presence of the STA, and inform the Cloud Server about the detection.

A Basic Service Set Identifier (BSSID) may be used to identify the STA_Owner. For example, if a STA_Z has established a connection with an AP-Z private network interface, then the BSSID (i.e., the MAC address) of this interface may be identified as the STA_Owner of the STA_Z. In another scenario, a client may have no STA_Owners, in which case the client would associate only with public networks. Alternatively, a client may have more than one STA_Owner, in which case it would be able to associate with more than one private network.

Unassociated-client-monitoring functionality may help a CSD detect the presence of clients that are currently not associated with any interfaces of their STA_Owner. The CSD may keep track of every client that has associated with its private network with a timestamp of the last association and use this information to identify its unassociated clients, then the clients which are not currently associated with any interfaces of the STA_Owner may be regarded as unassociated clients. The CSD may command the AP to perform unassociated-client-monitoring by specifying when to monitor for a STA(s) and which STA(s) to monitor for. Table 1 is an example log created by a CSD as part of an unassociated-client-monitoring functionality.

TABLE 1

Example of a Log Created by a CSD

| STA MAC ADDRESS | SSID-BSSID pairs that have been associated | Channel Capability | STA_Owner's BSSID |
| --- | --- | --- | --- |
| AA:BB:CC:00:00:01 | SSID_public - XX:YY:ZZ:00:00:01<br>SSID_private_A - XX:YY:ZZ:00:00:01<br>SSID_public - AB:CD:EF:00:00:01 | 1, 6, 11, 36, 100, 132 | XX:YY:ZZ:00:00:01 |
| DD:BB:CC:00:00:11 | SSID_public - XX:YY:ZZ:00:00:01<br>SSID_private_B - AB:CD:EF:00:00:01<br>SSID_public - AB:CD:EF:00:00:01 | 1, 6, 11, 36, 100, 149 | AB:CD:EF:00:00:01 |

In one embodiment, CSDs running on different APs that reside in different networks may require another means of communication, such as a Cloud Server accessed directly or via the Internet. The Cloud Server may be a remote server that stores client information, and gives responses to the A CSD running on an AP may trigger periodic scans in every Wi-Fi channel available. For example, if the AP is operating in channel 100 of the 5 GHz band, it may periodically go to every other channel in the 5 GHz band for a very short duration of time, called dwell time, and listen to the channel. For purposes of this example, it may be assumed that the AP has a single Wi-Fi radio that operates in the 5 GHz band, and thus, it does not operate in more than one channel at the same time, however, the concepts disclosed herein may be applied to scenarios involving MIMO. The dwell time may be selected such that it does not cause traffic disruption in the operating channel. The AP may listen to Wi-Fi packets in both its operating channel and other non-operating channels (through scans), and try to identify any packets originating from its unassociated clients. Specifically, a CSD may filter the scan results of the AP to identify any transmission from unassociated clients. If the CSD identifies a packet transmission with a MAC address to be a MAC address of an unassociated client, it logs the MAC address of the detected client/STA, the measured signal strength in terms of RSSI, the channel in which the observation is made, the BSSID (MAC) address present in the captured packet (as discussed herein, the term packet is used to denote a link layer frame), and/or the timestamp of the time at detection. In this way, the CSD may identify clients that are within range but are not currently connected to their preferred interface and/or network and/or SSID.

An example of logged information is shown in Table 2 below. In one instance, the CSD may send this information to a Cloud Server right after the detection, or in other instances, it may send this information within its periodic messages to the Cloud Server. If periodic messages are employed, there may be a delay (i.e., the time between the actual time of detection and a Cloud Servers awareness of the event) correlated with the message transmission period.

based on monitoring performed by the AP, and the cloud server may direct the AP to steer the STA to SSID_Private based on the received information. In an alternative scenario, the AP may make a determination on its own, based on monitored information and/or pre-configured settings, that the STA should be connected to SSID_Private, and the AP may proceed to steer the STA from SSID_Public to SSID_Private. In either scenario, steering between virtual networks may include the AP disassociating the STA from SSID_Public, blacklisting the STA on SSID_Public, and initiating a connection through SSID_Private.

Figure 3A:
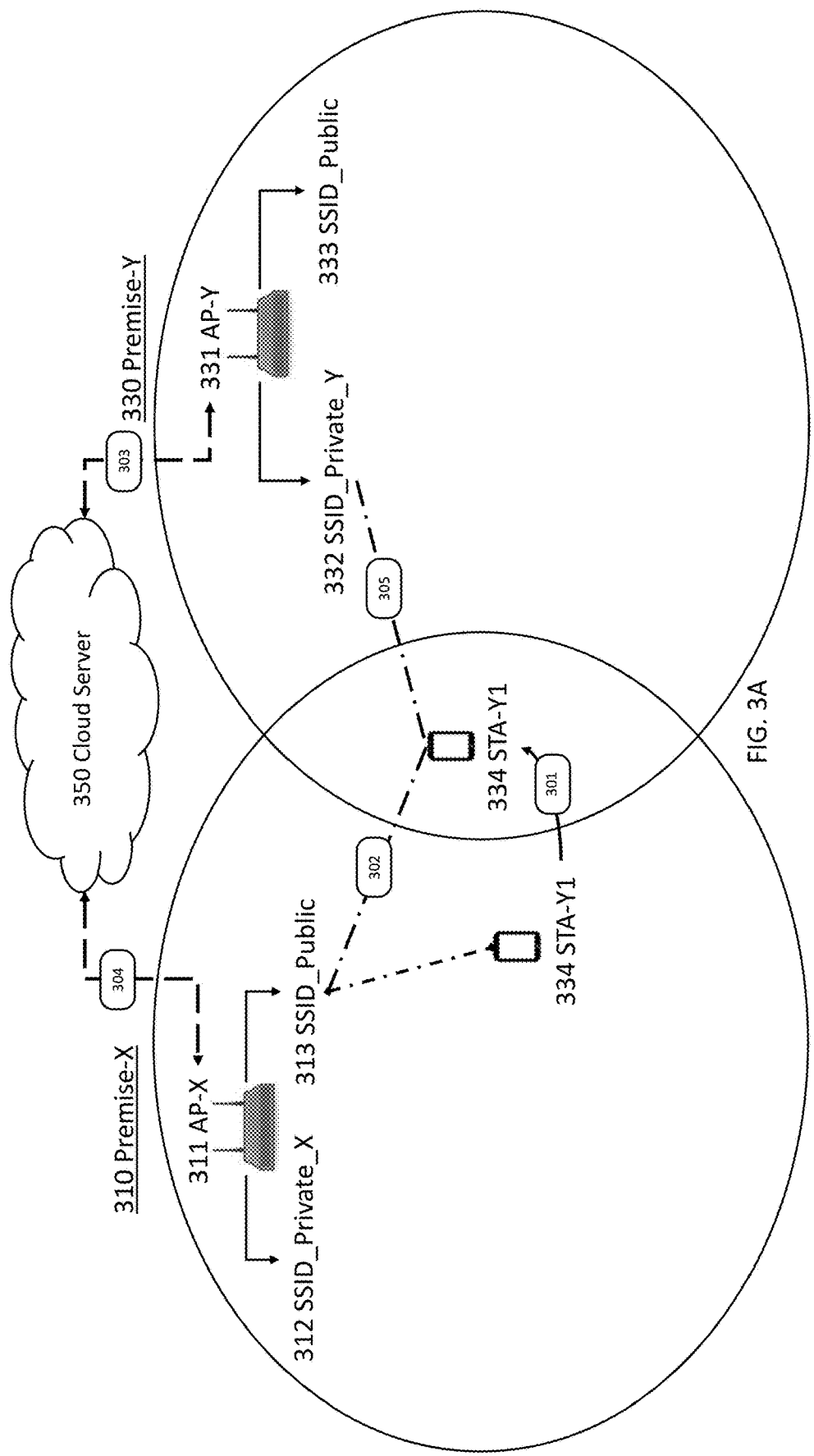
FIG. 3A illustrates an example scenario of multiple wireless networks that overlap where a client moves from one network to another.

FIG. 3A illustrates an example scenario similar to FIG. 2A, except the physically separated networks do in fact fall into the coverage range of one another. FIG. 3B illustrates a flow chart of an example process related to the scenario of FIG. 3A. In the scenario shown in FIG. 3A, 311 AP-X and 331 AP-Y may be connected to a 350 Cloud Server, and 311 AP-X's coverage and 331 AP-Y's coverage may overlap.

The 334 STA-Y1 may move 301 to a new location where 311 AP-X's and 331 AP-Y's coverage overlaps, and as a result, 334 STA-Y1 may remain connected 302 with 313 SSID_Public instead of transferring over to some network provided by 331 AP-Y; thus, even though 334 STA-Y1 comes back at 301 to the vicinity of its STA_Owner, (i.e., 330 Premise-Y), it still stays connected to 313 SSID_Public of 311 AP-X. In order to resolve this situation, a CSD of 331 AP-Y may employ unassociated-client-monitoring functionality.

TABLE 2

Example of a Log Sent to a Cloud Server

| STA MAC ADDRESS | STA_owner's BSSID (also the observing BSSID) | Observed BSSID | Observed Channel | Measured RSSI (dBm) | Timestamp of the observation |
|---|---|---|---|---|---|
| AA:BB:CC:00:00:01 | XX:YY:ZZ:00:00:01 | AB:CD:EF:00:00:01 | 149 | −70 | 23/04/2017-10:30:45 |
| DD:BB:CC:00:00:11 | AB:CD:EF:00:00:01 | AB:CD:EF:00:00:01 | 149 | −65 | 23/04/2017-10:32:54 |
| AA:BB:CC:00:00:01 | XX:YY:ZZ:00:00:01 | AB:CD:EF:00:00:00 | 1 | −68 | 23/04/2017-10:36:55 |

In one instance, a CSD may check the Cloud Server to determine if any of the clients that are associated with its public network have been detected within the vicinity of its STA_Owner; also, the CSD may carry out this action periodically (i.e., the CSD periodically queries the Cloud Server for information) or based on some event (e.g., a new STA joining). Alternatively, the Cloud Server may send a message to the CSD that runs on the AP where the STA is currently associated, since the Cloud Server may know which BSSID the STA is currently associated with, and it may directly inform the CSD running on the AP where the STA is associated with that the STA's STA_Owner is in the vicinity of the STA, thereby commanding/causing steering of the AP currently associated with the STA to the AP of the STA_Owner. In other instances, the steering may be between virtual networks, networks, specific SSIDs, APs of the same network (i.e., mesh networks) and any combination thereof.

In one example, an AP may operate two virtual networks, an SSID_Private and an SSID_Public. A STA may be connected to SSID_Public, but the STA may have a better connection (e.g., unrestricted bandwidth) if the STA was connected to the SSID_Private. In one scenario, the AP may send the cloud server information that it monitored/logged based on the connections of the AP and observations made At 303, unassociated-client-monitoring may be performed, and the CSD of 331 AP-Y may send logged information from the results of the unassociated-client-monitoring to a 350 Cloud Server.

At 304, once the CSD running on 311 AP-X learns that 334 STA-Y1 is in close vicinity of its STA_Owner 331 AP-Y, either through checking with or being informed by the 350 Cloud Server as discussed herein, the CSD of 311 AP-X may initiate steering at 305 of 334 STA-Y1 to the private network of 331 AP-Y, 332 SSID_Private_Y.

Figure 4A:
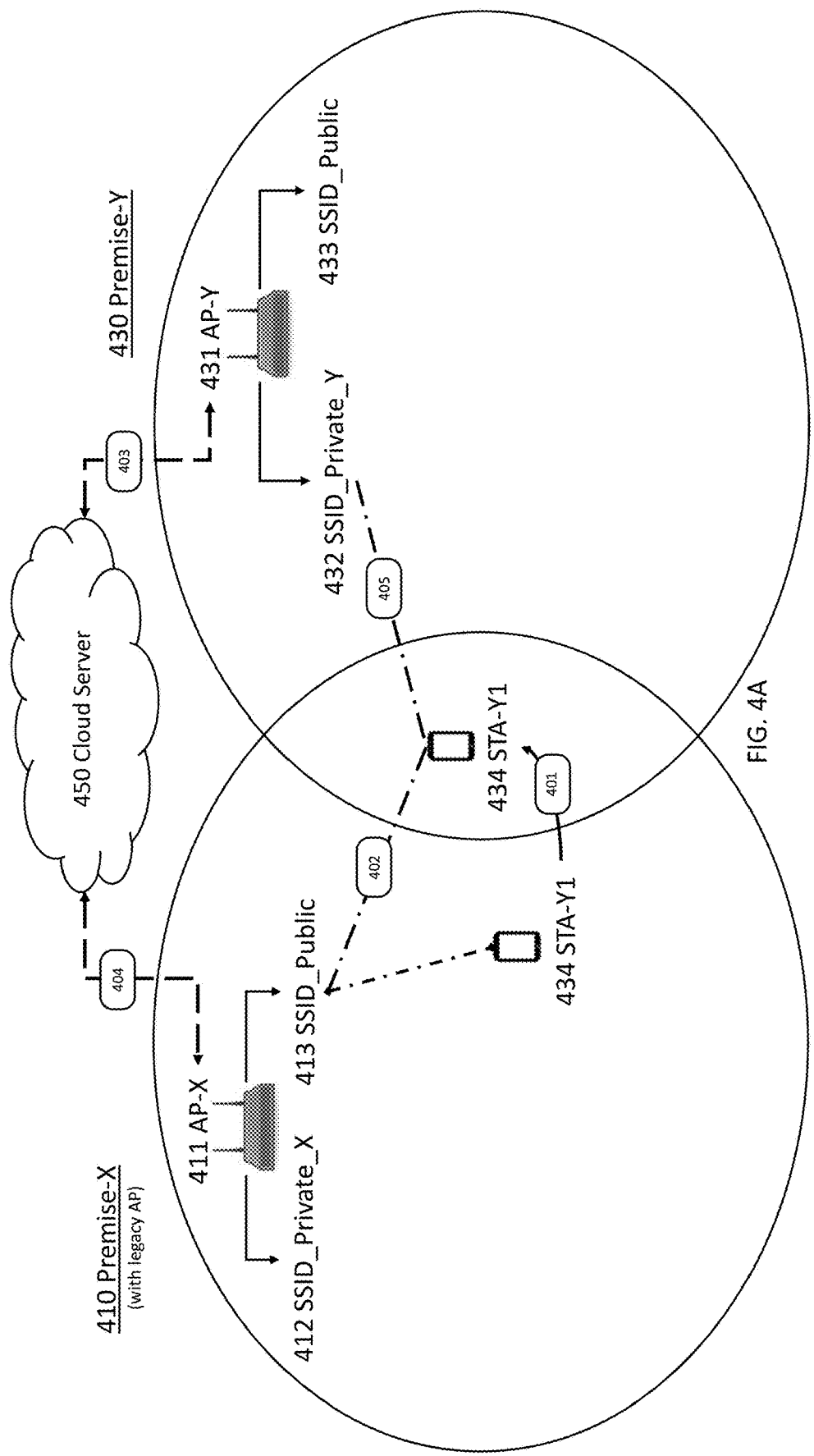
FIG. 4A illustrates an example scenario of multiple wireless networks that overlap where a client moves from one network to another.

FIG. 4A illustrates an example scenario similar to FIG. 3A, except 411 AP-X may be a legacy AP that does not employ a CSD. FIG. 4B illustrates a flow chart of an example process related to the scenario of FIG. 4A. Just as in the scenario associated with FIG. 3A, 411 AP-X's coverage and 431 AP-Y's coverage overlap. Initially, 434 STA-Y1 is associated with the public Internet service provided by the Legacy 411 AP-X, 413 SSID_Public. At 401, 434 STA-Y1 comes back to the vicinity of its STA_Owner, (i.e., 430 Premise-Y), but still stays connected at 402 to 413 SSID_Public of 411 AP-X.

The CSD running on 431 AP-Y may detect the presence of 434 STA-Y1 through its unassociated-client-monitor function, as discussed herein. Note that the CSD of 431 AP-Y knows that 434 STA-Y1 originally belonged to its private network.

The CSD running on 431 AP-Y sends the information about the detected 434 STA-Y1 to the 450 Cloud Server at 403. Moreover, based on 434 STA-Y1's observed RSSI level, the CSD may prefer 434 STA-Y1 to connect to its 432 SSID_Public or one or more interfaces for 433 SSID_Private_Y if there are multiple interfaces defined for 433 SSID_Private_Y. Depending on its preference, the CSD of 431 AP-Y may blacklist 434 STA-Y1 on all its SSIDs (i.e., logical interfaces), except for the preferred logical interface (i.e., 433 SSID_Private_Y).

Upon receiving the information from the CSD of 431 AP-Y, the 450 Cloud Server sends a deauthenticate 434 STA-Y1 command to Legacy 411 AP-X at 404. Since 431 AP-Y has blacklisted 434 STA-Y1 on all interfaces except for a preferred interface, once the 434 STA-Y1 is deauthenticated from 413 SSID_Public of Legacy 411 AP-X, the 434 STA-Y1 will associate with the preferred and only available interface available at 405 (i.e., it will associate with 432 SSID_Private_Y since it is not blacklisted).

As disclosed above, embodiments, scenarios, and examples have generally related to use cases where each network comprises only one Wi-Fi GW or AP, however, this is not meant to be a limitation but rather a simplified explanation to demonstrate the disclosed concepts. These same concepts may also be applied to use cases where each network comprises multiple Wi-Fi GWs or APs.

Figure 5A:
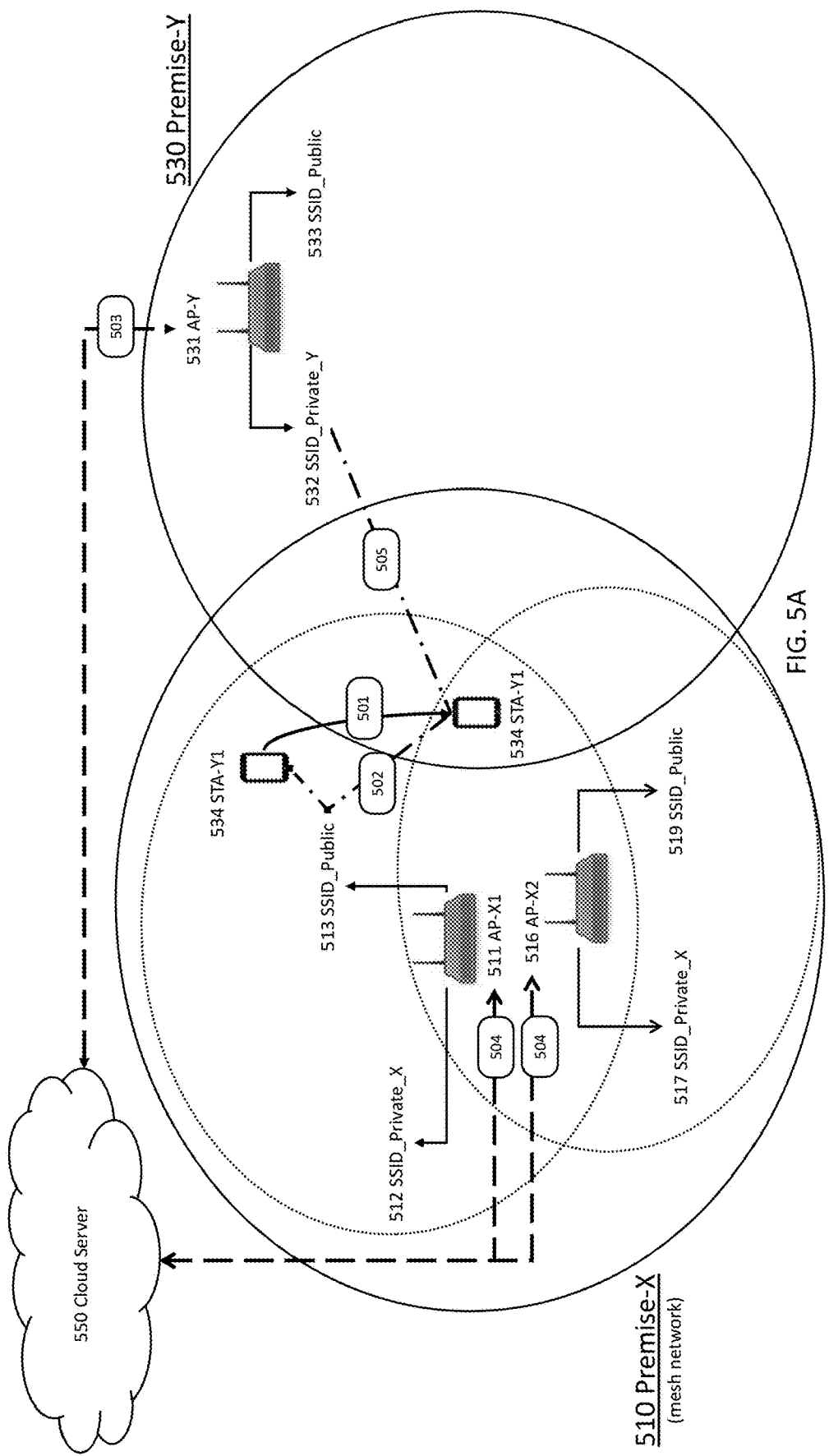
FIG. 5A illustrates an example scenario of multiple wireless networks, where one network has multiple mesh access points, and the multiple networks overlap where a client moves from one network to another.

FIG. 5A illustrates a scenario similar to FIG. 3A in that there may be two networks that overlap that utilize CSDs connected to a Cloud Server, except one network may have multiple APs, 511 AP-X1 and 516 AP-X2, that form a mesh network at 510 Premise-X. A CSD may run on each mesh AP, and each mesh AP may communicate with each other. Furthermore, a CSD running on a mesh AP may communicate with a Cloud Server. FIG. 5B illustrates a flow chart of an example process related to the scenario of FIG. 5A.

In this scenario, 534 STA-Y1 may move 501 to a location that is covered by both 510 Premise-X's network and 530 Premise-Y's network. Additionally, 534 STA-Y1's new location may be covered by both APs of 510 Premise-X's network, 511 AP-X1 and 516 AP-X2. At 502 after the move it may maintain its connection to 513 SSID_Public even though it is within range of its STA_Owner, and a preferred interface is available at 532 SSID_Private_Y, potentially offering a better connection. At 503, unassociated-client-monitoring may be performed and the CSD of 531 AP-Y may send logged information from the results of the unassociated-client-monitoring to a 550 Cloud Server.

The CSDs of the mesh network of 510 Premise-X may not use a central controller to gather/send measured information to the 550 Cloud Server. Each CSD may individually send/gather information. At 504, the CSD running on 511 AP-X1 may learn that 534 STA-Y1 is in close vicinity of its STA_Owner 531 AP-Y, either through checking with or being informed by the 550 Cloud Server as discussed herein. Further, the CSD running on 516 AP-X2 may also learn that 534 STA-Y1 is in close vicinity of its STA_Owner 531 AP-Y. At 505, the CSD of 511 AP-X1 and the CSD of 516 AP-X2 may initiate steering of 534 STA-Y1; in this case the steering may include each AP blacklisting all of the SSID_Public interfaces of the mesh network of 510 Premise-X as well as 530 Premise-Y; thereafter, 534 STA-Y1 is associated with the preferred network/interface of 531 AP-Y, 532 SSID_Private_Y.

There may be variations of the scenario of FIG. 5A where clients may be steered (1) within the same network, among the same SSIDs, but across different APs; (2) within the same network, among different SSIDs of the same AP; (3) within the same network, among different SSIDs of different APs; (4) across different networks, but within the same SSID; (5) across different networks, and between different SSIDs. Accordingly, any one specific client, or a group of clients, may be steered to any one interface, or group of interfaces, using the techniques and concepts disclosed herein.

Figure 6A:
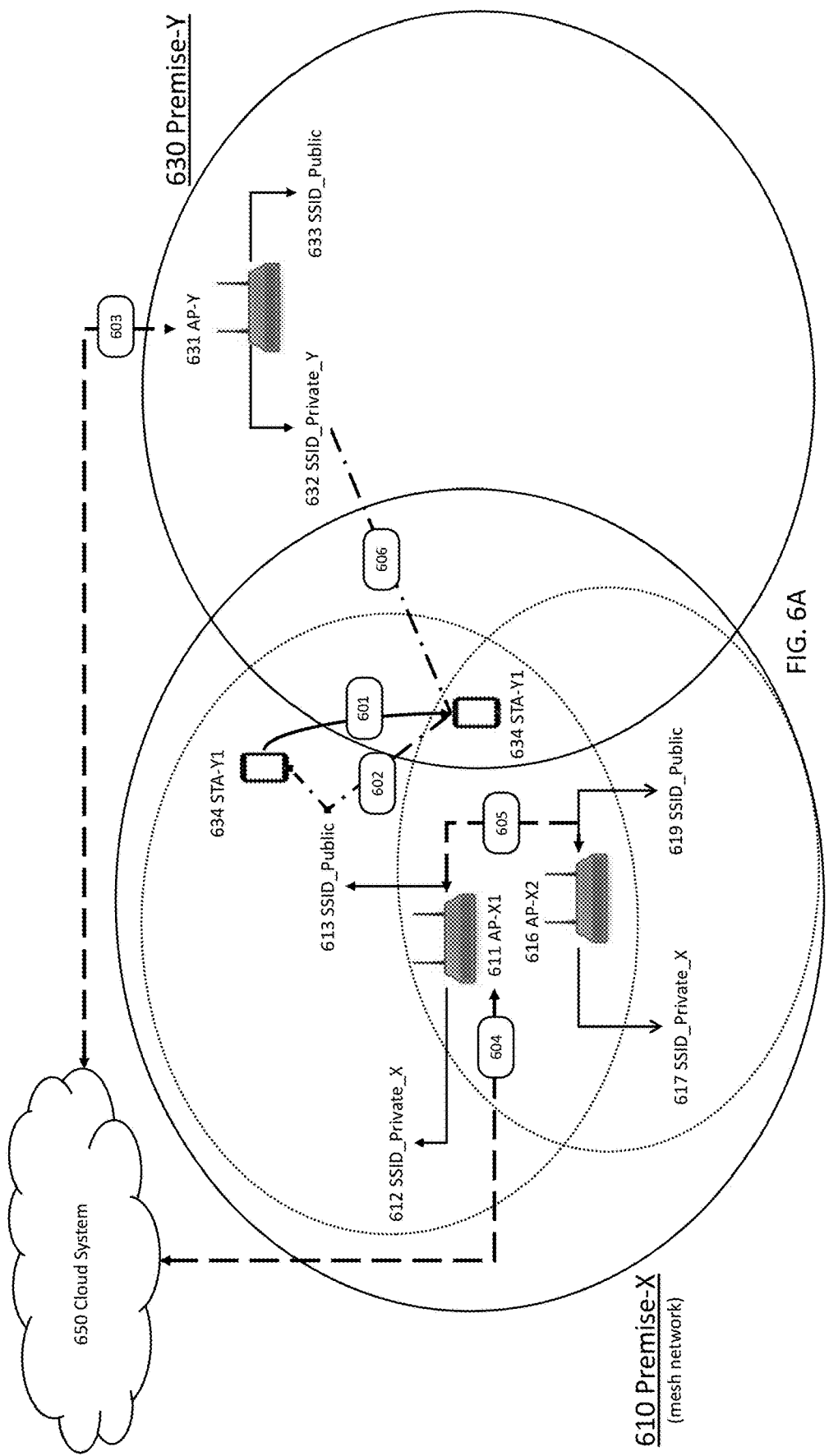
FIG. 6A illustrates an example scenario of multiple wireless networks, where one network has multiple mesh access points, and the multiple networks overlap where a client moves from one network to another.

FIG. 6A illustrates a scenario similar to FIG. 5A, except a mesh network at 610 Premise-X may have a central controller. Also, in this scenario a CSD may run on a central AP which in turn controls/commands/receives/sends information to each mesh AP. FIG. 6B illustrates a flow chart of an example process related to the scenario of FIG. 6A.

In this scenario, 634 STA-Y1 may move 601 to a location that is covered by both 610 Premise-X's network and 630 Premise-Y's network. Additionally, 634 STA-Y1's new location may be covered by both APs of 610 Premise-X's network, 611 AP-X1 and 616 AP-X2. At 602, after the move it may maintain its connection to 613 SSID_Public even though it is within range of its STA_Owner, and a preferred interface is available at 632 SSID_Private_Y, potentially offering a better connection. At 603, unassociated-client-monitoring may be performed and the CSD of 631 AP-Y may send logged information from the results of the unassociated-client-monitoring to a 650 Cloud Server.

The CSDs of the mesh network of 610 Premise-X may use a central controller 611 AP-X1 to gather/send measured information to the 650 Cloud Server on behalf of all of the APs of the meshed network. At 604, the CSD running on 611 AP-X1 may learn that 634 STA-Y1 is in close vicinity of its STA_Owner 631 AP-Y, either through checking with or being informed by the 650 Cloud Server as discussed herein, and then communicate this information to 616 AP-X2. At 605, the CSD of 611 AP-X1 steers 634 STA-Y1 by deauthenticating 634 STA-Y1 and then blacklisting 634 STA-Y1 on all of the SSID_Public interfaces of the mesh network of 610 Premise-X, including sending a command to 631 AP-X2, as well as 630 Premise-Y. Thereafter, 634 STA-Y1 is associated with the preferred network/interface of 631 AP-Y, 632 SSID_Private_Y.

Figure 7:
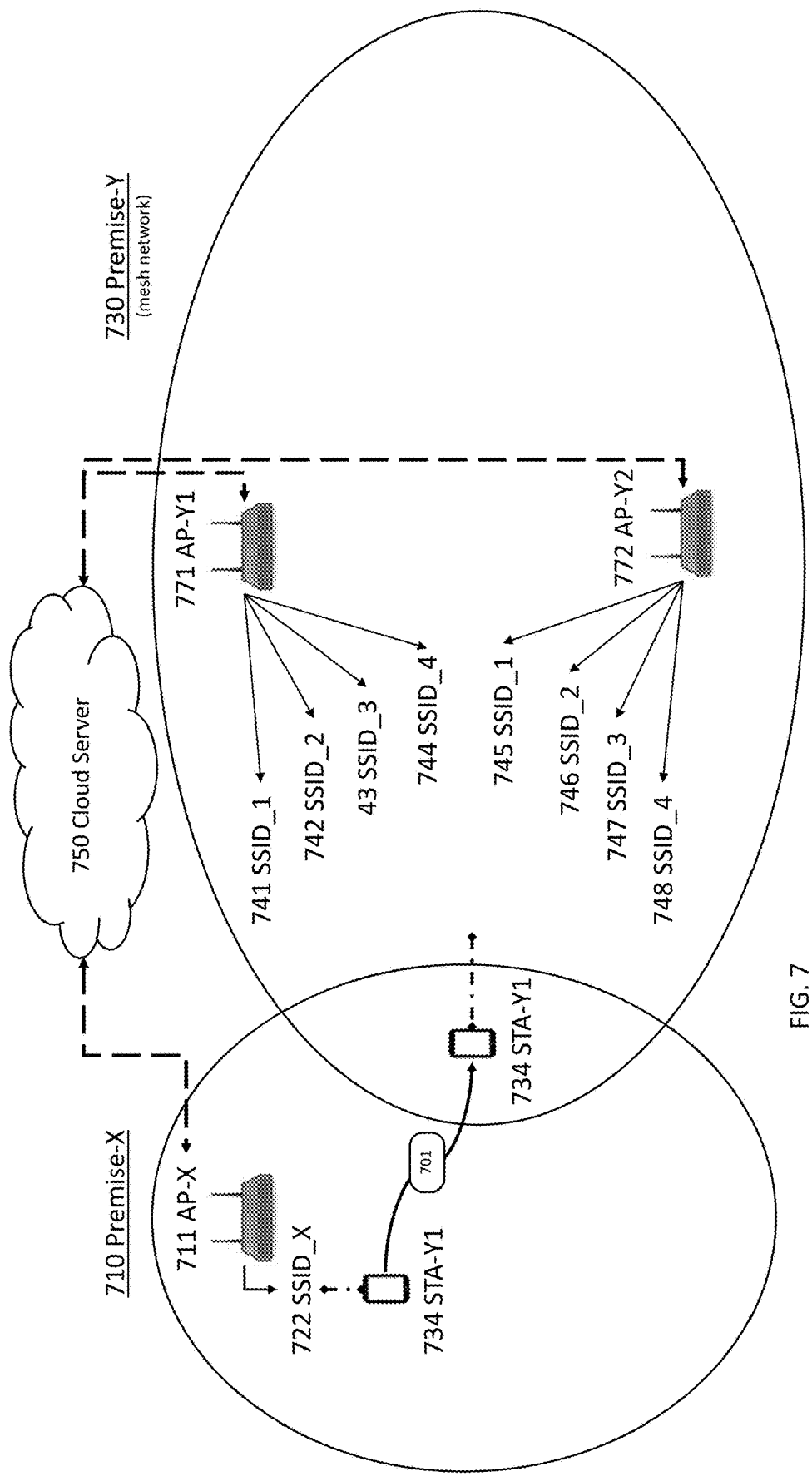
FIG. 7 illustrates an example scenario with a plurality of logical interfaces in a mesh network.

FIG. 7 illustrates an embodiment where a client may be steered within a single network, among multiple logical interfaces each of which is identified by a different SSID. In such a case, end-to-end cost calculation, carried out by a CSD of the AP where the STA is associated, for deciding on where to steer the STA may take into account additional cost parameters, such as the priority of a logical interface (i.e., SSID).

The 730 Premise-Y may have a mesh network with 2 APs, 771 AP-Y1 and 772 AP-Y2, where each AP may have four different logical interfaces with different SSIDs; 771 AP-Y1 may have 741 SSID_1, 742 SSID_2, 743 SSID_3, and 744 SSID_4, and 772 AP-Y2 may have 745 SSID_1, 746 SSID_2, 747 SSID_3, and 748 SSID_4. An SSID prioritization policy may be such that for each AP, SSID_1 is the highest priority, SSID_2 is the second, SSID_3 is the third, and SSID_4 is the fourth. While evaluating connection alternatives, SSID_1 may have precedence over SSID_2 depending on the calculated costs. For example, when 734 STA-Y1 moves 701 within range of 730 Premise-Y the end-to-end cost for the 734 STA-Y1 may be AP1_C1 if it was connected to 741 SSID_1 of 771 AP-Y1, whereas it may be AP2_C1 if it was connected to 745 SSID_1 of 772 AP-Y2. Likewise, the end-to-end cost for the 734 STA-Y1 may be AP1_C2 if it was connected to 742 SSID_2 of 771 AP-Y1, and it may be AP2_C2 if it was connected to 746 SSID_2 of 772 AP-Y2.

In one embodiment, the policy that governs the decision of where to steer a client (i.e., STA) may be such that (1) if the alternatives have the same priority levels (e.g., AP1_C1 and AP2_C1) then a the client is steered to the one with the lowest cost; (ii) if the alternatives have different priority levels (e.g., AP1_C1 and AP2_C2 or AP1_C1 and AP1_C2) then the client is steered to the one that attains the highest priority while resulting in no more than N % (e.g., 10%) higher cost for each priority level between the alternatives. For example, consider a scenario where the alternatives for a STA are AP1_C1=1400, and AP2_C3=1000, and assume that the STA is currently associated with AP2. The priority level difference is C1−C3=2, and AP1_C1 is 40% higher than AP2_C3. Further consider for this example that for each priority level difference, 10% cost may be compromised, where it follows that the cost calculation would result in 1000*2*10%=200. Therefore, AP1_C1 would be favored over AP2_C3 if its cost is 1200 or lower, however, since this is not true, AP2_C3 is favored. So, the STA is kept at AP2, and not steered to AP1. In other cases, different prioritization schemes and different compromise policies between cost and priority may be employed.

Client-based SSID priorities may be assigned, in addition to or in alternative to the concepts discussed herein. For example, there may be a first wireless client STA-1 for which the logical interface SSID_1 may have the highest priority, and there may be a second wireless client STA-2 for which the logical interface SSID_2 may have higher priority than logical interface SSID_1; in this way, a selected set of clients may be kept at designated SSIDs. Further, a set of clients that demand high QoS may be kept at one SSID that is allocated with the highest network resources, whereas another set of clients that has low QoS requirements may be kept at another SSID that has access to only limited network resources.

Although features and elements are described above in particular combinations, one of ordinary skill in the art will appreciate that each feature or element can be used alone or in any combination with the other features and elements. Further, while examples may be given with one element performing the action, it is envisioned that any element as described herein may carry out the functions described with regard to another element (e.g., an AP may carry out the functions of a Cloud Server, and vice versa). In addition, the methods described herein may be implemented in a computer program, software, or firmware incorporated in a computer-readable medium for execution by a computer or processor in conjunction with a communications interface (e.g., receiver, transmitter, wireless interface, wired interface, transceiver, and the like). Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used in conjunction with a communications interface for use in a GW, STA, AP, terminal, base station, RNC, computer, laptop, tablet, smartphone, server, or any host computer.

What is claimed:

1. A method implemented by a client steering daemon operating on an access point (AP) for steering a station (STA), the method comprising:

determining one or more cost parameters for steering a STA from a current logical interface of the AP to one or more destination logical interfaces, wherein each logical interface is associated with an 802.11 Service Set Identifier (SSID), and wherein the one or more cost parameters includes a client-based SSID prioritization policy which includes an assignment of a first set of STAs with a first SSID prioritization and a second set of STAs with a second SSID prioritization;

computing an end-to-end cost for each of the one or more destination logical interfaces based on the one or more cost parameters, and based in part on whether the STA is in the first set of STAs or in the second set of STAs; and steering the STA to a new logical interface of the one or more destination logical interfaces based on evaluating each computed end-to-end cost.

2. The method of claim 1, wherein the client-based SSID prioritization policy is received, and processed at the CSD, from the central controller.

3. The method of claim 1, wherein the STA is steered from the current logical interface of the AP of a first network to the new logical interface of a second AP of a second network.

4. The method of claim 1, wherein the STA is steered from the current logical interface of the AP of a first network to the new logical interface of the AP of the first network.

5. The method of claim 1, wherein the one or more cost parameters are received from a cloud server.

6. The method of claim 5, wherein the client steering daemon (CSD) receives instructions from the cloud server to steer the STA.

7. An access point (AP) operating a client steering daemon (CSD) for steering a station (STA), the AP comprising:

a transceiver;

a processor operatively connected to the transceiver, the process and transceiver configured to operate a CSD, wherein the CSD is configured to:

determine one or more cost parameters for steering a STA from a current logical interface of the AP to one or more destination logical interfaces, wherein each logical interface is associated with an 802.11 Service Set Identifier (SSID), and, wherein the one or more cost parameters includes a client-based SSID prioritization policy which includes an assignment of a first set of STAs with a first SSID prioritization and a second set of STAs with a second SSID prioritization;

compute an end-to-end cost for each of the one or more destination logical interfaces based on the one or more cost parameters, and based in part on whether the STA is in the first set of STAs or in the second set of STAs; and steer the STA to a new logical interface of the one or more destination logical interfaces based on evaluating each computed end-to-end cost.

8. The AP of claim 7, wherein the client-based SSID prioritization policy is received, and processed at the CSD, from the central controller.

9. The AP of claim 7, wherein the STA is steered from the current logical interface of the AP of a first network to the new logical interface of a second AP of a second network.

10. The AP of claim 7, wherein the STA is steered from the current logical interface of the AP of a first network to the new logical interface of the AP of the first network.

11. The AP of claim 7, wherein the one or more cost parameters are received from a cloud server.

12. The AP of claim 11, wherein the CSD receives instructions from the cloud server to steer the STA.

13. A system for steering a station (STA), the system comprising:
 the STA;
 a first access point (AP) with a current logical interface;
 a cloud server; and
 a client steering daemon (CSD) operating on the first AP,
  wherein the CSD receives cost parameters from the cloud server and computes an end-to-end cost for each possible steering of the STA from a current logical interface to one or more destination logical interfaces based on cost parameters that comprise a client-based SSID prioritization policy which includes an assignment of a first set of STAs with a first SSID prioritization and a second set of STAs with a second SSID prioritization, wherein each logical interface is associated with an 802.11 Service Set Identifier (SSID), and
  wherein the CSD steers the STA from the current logical interface to a new logical interface of the one or more destination logical interfaces based on evaluating each computed end-to-end cost and based in part on whether the STA is in the first set of STAs or in the second set of STAs.

14. The system of claim 13, wherein the current logical interface is in a first network and the destination logical interface is in a second network.

15. The system of claim 13, wherein the current logical interface is in a first network and the destination logical interface is in the first network.

16. The system of claim 13, wherein the client-based SSID prioritization policy is received, and processed at the CSD, from the central controller.

\* \* \* \* \*